United States Patent [19]
Takimoto et al.

[11] Patent Number: 5,367,045
[45] Date of Patent: Nov. 22, 1994

[54] POLYURETHANE MATERIAL FOR MOLDING PAD COVER

[75] Inventors: Masahiro Takimoto; Hisashi Mizuno; Shinji Jinushi, all of Inazawa, Japan

[73] Assignee: Toyoda Gosei Co., Ltd., Nishikasugai, Japan

[21] Appl. No.: 107,311

[22] Filed: Aug. 17, 1993

[30] Foreign Application Priority Data

Sep. 4, 1992 [JP] Japan .................................. 4-262890

[51] Int. Cl.$^5$ .............................................. C08G 18/18
[52] U.S. Cl. ........................................ 528/53; 528/54; 264/299
[58] Field of Search ...................... 528/53, 54; 264/299

[56] References Cited

U.S. PATENT DOCUMENTS 4,444,704  4/1984  Hira et al. ........................... 264/45.5
5,179,132  1/1993  Mizuno et al. ....................... 521/174

Primary Examiner—Maurice J. Welsh
Attorney, Agent, or Firm—Cushman, Darby & Cushman

[57] ABSTRACT

A material for producing a pad cover molding polyurethane, comprsing a polyol, an isocyanate and an urethane reaction retarding catalyst comprising a tertiary amine blocked with an acid such as formic acid, said material containing neither any fluorocarbon nor any chlorofluorocarbon. The polyurethane material according to the present invention is capable of molding a non-foamed or sparsely foamed lacuna-free pad cover although the material contains neither any fluorocarbon nor any chlorofluorocarbon.

5 Claims, 3 Drawing Sheets

POLYURETHANE MATERIAL FOR MOLDING PAD COVER

BACKGROUND OF THE INVENTION

1. Field of the Invention

This invention relates to a material for producing a polyurethane (hereinafter referred to as polyurethane material) used for reactive injection molding (hereinafter referred to as RIM) of a cover of a pad to be set on an automobile stearing wheel.

2. Description of the Related Art

The term "flon" used in the specification of the invention is a generic name for fluorocarbons and chlorofluorocarbons.

The conventional pad covers have been made by RIM using as foaming agent a polyurethane material blended with a specific flon CFC-11 (trichloromonofluoromethane) or an alternate flon such as HCFC-123 (2,2-dichloro-1,1,1-trifluoroethane), HCFC-141b (1,1-dichloro-1-fluoroethane) or HCFC-22 (monochlorodifluoroethane). This molding method is explained briefly below.

A polyol mixture comprising a premix of a polyol, a flon, a catalyst and a pigment and an isocyanate are mixed in a specified ratio by means of impingement mixing in a mixing head to prepare a polyurethane material, which is cast into the cavity of a mold. An urethane reaction is immediately induced between the polyurethane mixture and the isocyanate through the medium of the catalyst, and the flon is volatilized by the heat of reaction to form a foam. Thus, the polyurethane material is gradually foamed and caused to flow in the cavity. By this process, a densely foamed core portion is formed in the inside of the molded cover while a sparsely foamed compact skin is formed at the surface portion of the cover due to the cooling action of the mold. Thus, the molded pad cover has an integral-skin foam structure.

Recently, the detrimental effect of flon on the ozone layer in the atmosphere has become a matter of serious concern, which has prompted many of the flon-producing countries to regulate the production of flon, and it is expect that use of not only the specific flon CFC-11 but also the alternate flons, such as HCFC-123, HCFC-141b and HCFC-22, will be totally banned in the near future. In view of the above, the present inventors have successfully demonstrated the feasibility of RIM of a non-foamed or sparsely foamed pad cover by using a polyurethane material containing no flon as described below.

First, by using a polyurethane material prepared without adding any flon in otherwise the same way as in the prior art (refer to Comparative Example 1), a cover 51 (FIG. 3) of an air bag-housing pad with a substantial volume was molded. The fluidity of the polyurethane material was poor however, from the time immediately after casting into the mold, and a lacuna 53 was produced at an end (the remotest end from the material casting gate 52) of the molding. It is thought that the catalyst promoted the urethane reaction, causing rapid thickening. The absence of flon, which is known to reduce viscosity of the polyurethane material and enhance foaming, led to the unacceptable results.

A number of strategies have been directed at enhancing the fluidity of the polyurethane material, such as reducing the content of the catalyst (Comparative Examples 2 and 3), lowering the viscosity of the material by selecting the optimal composition of the polyol mixture for producing a similar viscosity lowering action as flon (Comparative Example 4), and conducting air loading at a high rate for producing an effect similar to the foaming action of flon (Comparative Examples 5 and 6), each of these strategies however, have been unsatisfactory to enhance the fluidity of the polyurethane material. Lacuna was still formed in the molding.

The object of the present invention is to eliminate the above-described difficulties and to provide a novel polyurethane material which, although containing no foaming agent such as flon, is capable of molding a non-foamed or only sparsely foamed pad cover free of lacuna.

SUMMARY OF THE INVENTION

The present invention provides a material for producing, for example, a molded polyurethane pad cover containing a polyol, an isocyanate and an urethane reaction retarding catalyst comprising a tertiary amine blocked with an acid such as formic acid wherein the material does not contain any foaming agent such as fluorocarbon or chlorofluorocarbon.

According to the present invention, a polyurethane molding material is provided in which, no foaming agent is added, but rather, an urethane reaction retarding catalyst comprising a tertiary amine blocked with an acid such as formic acid is added to a polyurethane material of polyol and isocyanate.

DETAILED DESCRIPTION OF THE INVENTION

Figure 1:
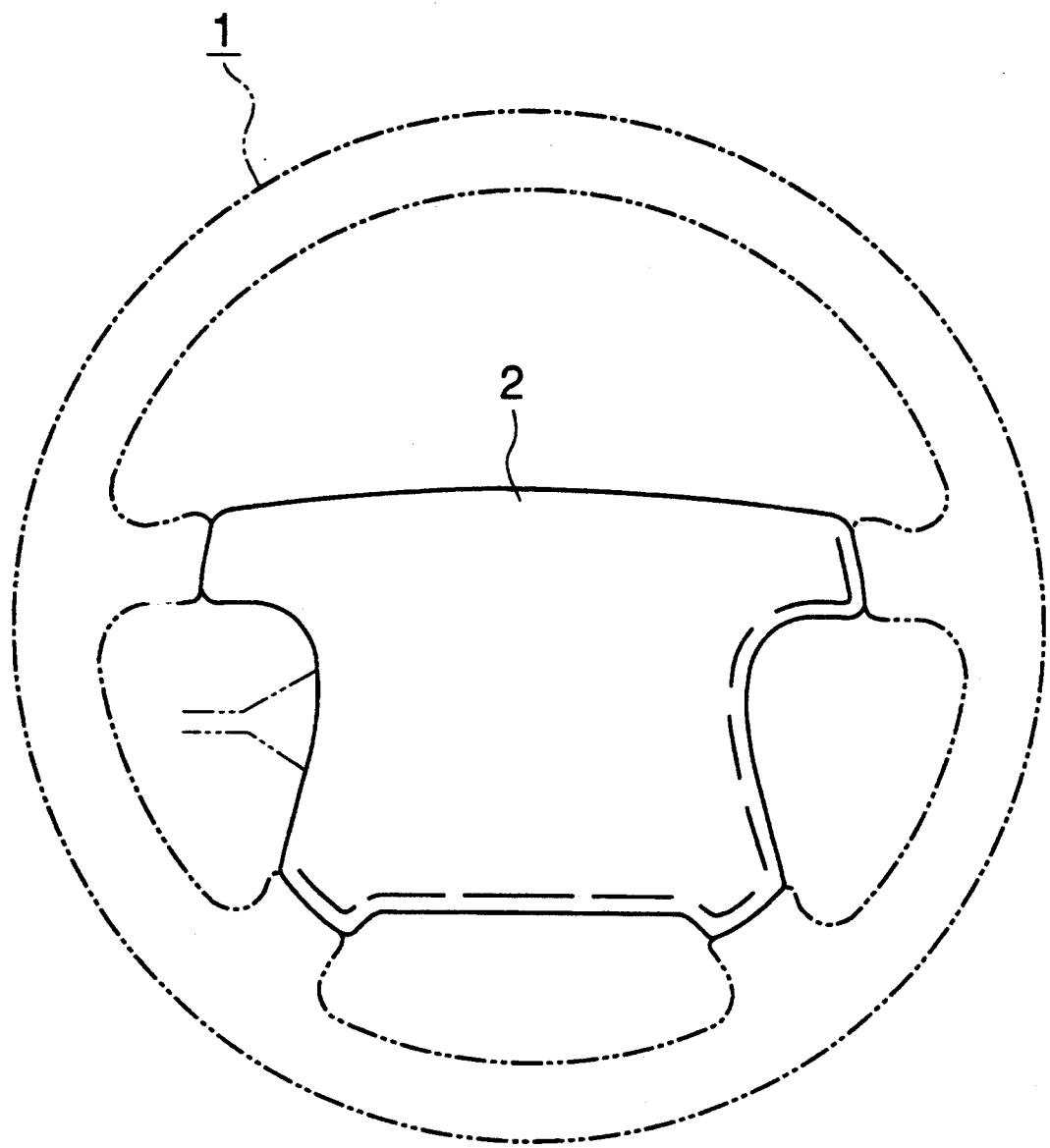
FIG. 1 is a frontal view of a pad cover molded with a polyurethane material according to the present invention.

As the polyol in the polyol mixture, there can be used the polyols commonly employed for RIM, such as the polyether type polyols and polyester type polyols, a representative sample of which are described below, either individually or in combination.

The polyether type polyols include the bi-, tri- and tetra-functional polyols obtained by reacting low-molecular weight polyols such as ethylene glycol, diethylene glycol, glycerin, trimethylolpropane, bisphenol A, etc., with cyclic ethers such as ethylene oxide, propylene oxide, butylene oxide, styrene oxide, etc., and the polymer polyols obtained by graft polymerizing vinyl monomers with said polyols.

The polyether type polyols include the polyols obtained by reacting excess diols such as ethylene glycol, polyoxyethylene glycol, dipropylene glycol, polyoxypropylene glycol, etc., with dicarboxylic acids such as succinic acid, glutaric acid, adipic acid, piperic acid, etc.

As the isocyanate in the composition of this invention, there can be used those usually employed for RIM, for example, aliphatic isocyanates and aromatic isocyanates such as mentioned below.

The aliphatic isocyanates which may be used in this invention include, aliphatic isocyanates, alicyclic isocyanates and so-called non-yellowing isocyanates such as hexamethylene diisocyanate (HMDI), hydrogenated xylene diisocyanate (hydrogenated XDI), 4,4-methylenebisdicyclohexyl diisocyanate (H121MDI), methylcyclohexyl diisocyanate (hydrogenated TDI), isophorone diisocyanate (IPDI), etc., and the polymerized versions of these isocyanates (polymerized for facilitation of handling) which include dimers, trimers, trimethylolpropane adducts, prepolymers, etc. The prepolymers include, for example, a product obtained by reacting 2 moles of a diisocyanate and 1 mole of a glycol (polyol) and having —NCO at both terminals.

The aromatic isocyanates include xylene di-isocyanate (XDI), 4,4'-diphenylmethane diisocyanate (hereinafter represented by MDI), crude MDI, liquid MDI, tolylene diisocyanate, phenylene diisocyanate, etc., and the polymerized versions of these isocyanates (polymerized for facilitation of handling) which include dimers, trimers, trimethylolpropane, prepolymers, etc.

The urethane reaction retarding catalyst of the present invention preferably has a tertiary amine blocked with an acid such as formic acid which is available to retard the urethane reaction prior to block dissociation and expedite the urethane reaction subsequent to block dissociation. "Block" herein refers to the formation of a salt of the tertiary amine with the acid. The acid used to block the tertiary amine may include formic acid, acetic acid, phenol, oleic acid and the like. Formic acid is preferable used.

The tertiary amine may include triethylene diamine, bis(2-dimethylaminoethyl)ether and N,N,N'-trimethylaminoethylpiperazine and the like, and be used individually or in combination. Preferably, the above-mentioned three specific tertiary amines are used in combination from the point of view of balance between materials fluidity and curability.

The polyurethane material may contain, besides the catalyst, a surfactant, a pigment and/or other necessary additive(s).

As described herein, an urethane reaction retarding catalyst comprising a tertiary amine blocked with the acid is contained in the polyurethane material of the present invention. Hereinafter, embodiments using formic acid as the acid are described. The amount of the urethane reaction retarding catalyst is practically 0.5 to 3.0 parts by weight based on 100 parts by weight of the polyol. Since the formic acid blocks of this catalyst remain associated in the period just after casting into the mold, the urethane reaction is retarded in this early phase. This deters thickening of the polyurethane material and elevates the materials initial fluidity even in the absence of flon. Therefore, the polyurethane material of the present invention is able to completely fill the mold which eliminates lacuna generation. Further, the catalyst will expedite the urethane reaction as the formic acid blocks of the catalyst are dissociated due to reaction heat. Thus, the time required for curing in the present invention is similar to conventional RIM practice.

EXAMPLES

Figure 2:
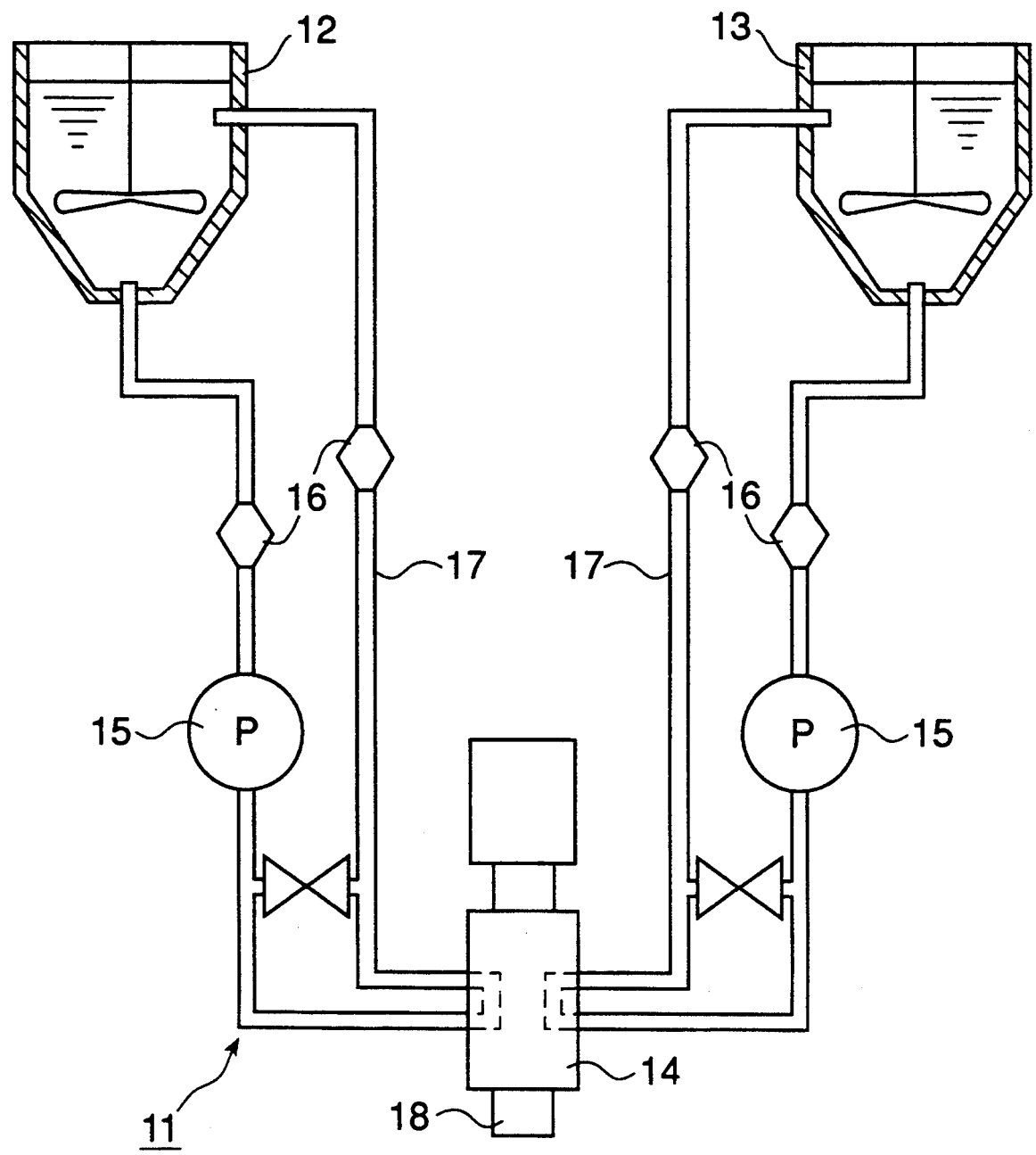
FIG. 2 is a schematic illustration of the polyurethane material injection mechanism for RIM.
Figure 3:
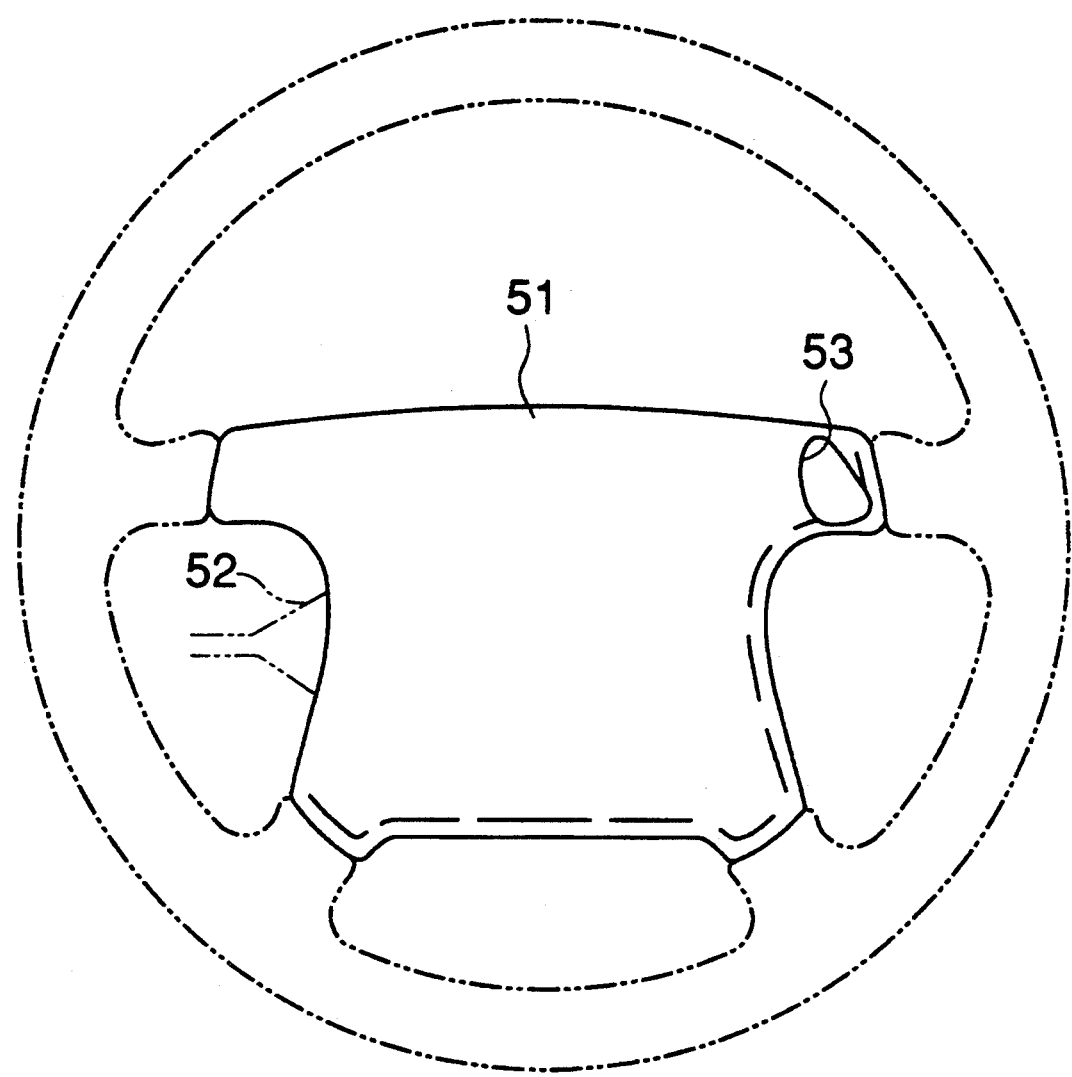
FIG. 3 is a frontal view of a pad cover molded with a polyurethane material according to a comparative example.

The present invention is further described below, with reference to FIGS. 1 and 2, as well as the following examples, where the invention is described as a polyurethane material for molding a cover 2 of an air bag-housing pad for a stearing wheel 1 such as shown in FIG. 1.

The mold (not shown) used in the present examples is a conventional split type consisting of a fixed segment and a movable half. The material injection mechanism 11, as shown in FIG. 2, comprises a storage tank 12 for the polyol mixture, a storage tank 13 for the isocyanate and a mixing head 14, each of the tanks being connected to the mixing head by circulation lines 17 provided with high presssure pumps 15 and filters 16. This mechanism is capable of performing repeated impingement mixing of the polyol mixture and the isocyanate and circulation of these component substances. The injection nozzle 18 of the mixing head 14 is connected to the sprue of the mold.

The compositions of Examples 1 and 2 of the polyurethane material of this invention, the compositions of Comparative Examples 1–6 formulated for comparative rating of the effect of said compositions, and the results of molding by use of these compositions are shown in Table 1.

TABLE 1

| Composition of polyurethane material and results of molding (parts by weight) | | Examples | | Comparative Examples | | | | | |
|---|---|---|---|---|---|---|---|---|---|
| | | 1 | 2 | 1 | 2 | 3 | 4 | 5 | 6 |
| Polyol mixture | Polyether polyol | 100 | 100 | 100 | 100 | 100 | 100 | 100 | 100 |
| | Diethylene glycol | 8 | 8 | 8 | 8 | 8 | 8 | 8 | 8 |
| | Catalyst DABCO 33LV | 1.0 | 1.0 | 2.0 | 2.0 | 1.0 | 2.0 | 2.0 | 2.0 |
| | STANN BL | 0 | 0.02 | 0.02 | 0 | 0 | 0.02 | 0.02 | 0.02 |
| | Special retarding catalyst | 1.0 | 1.0 | 0 | 0 | 0 | 0 | 0 | 0 |
| | Pigment | 3 | 3 | 3 | 3 | 3 | 3 | 3 | 3 |
| Isocyanate MDI prepolymer | | 60 | 60 | 60 | 60 | 60 | 55 | 60 | 60 |
| Polyol viscosity (CPS/25° C.) | | 850 | 850 | 850 | 850 | 850 | 850 | 850 | 850 |
| Air loading rate (%) | | 3 | 3 | 3 | 3 | 3 | 3 | 10 | 20 |
| Fluidity (X indicates that the molding had a lacuna) | | O | O | X | X | X | X | X | X |

In the above table, "DABCO 33LV" is the trade name of a catalyst (a 33% dipropylene glycol solution of triethylenediamine) produced by Sankyo Air Products Co., Ltd. "STANN BL" is the trade name of a catalyst (dibutylene dilaurate) produced by Sankyo Yuki Gosei K.K. The "specific retarding catalyst" signifies the urethane reaction retarding catalyst comprising a tertiary amine blocked with formic acid, which is a feature of the present invention. The following composition was used as the retarding catalyst in Examples 1 and 2. Ethylene glycol was used as a solvent of the salts of the following tertiary amines.

| Formic acid | 10 wt % |
|---|---|
| Bis(2-dimethylaminoethyl)ether | 15 wt % |
| N,N,N'-trimethylaminoethylpiperazine | 15 wt % |

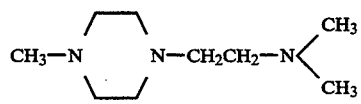

| Triethylenediamine | 20 wt % |
| Ethylene glycol | 40 wt % |

"Air loading" was performed by an inverter-controlled type stirrer with a maximum air loading rate of 20%.

In carrying out molding, a nylon net (not shown) was set in position in the cavity of the mold, and then the mold was closed (the fixed segment and the movable half were brought to their closing positions). Said polyol mixture and isocyanate were mixed in a specified ratio by impingement mixing in the mixing head 14 to prepare a polyurethane material, and this polyurethane material was cast into the cavity of the mold.

In Examples 1 and 2, wherein the specific retarding catalyst was added together with an ordinary catalyst, the polyurethane material perfectly filled the cavity, with the nylon net embedded therein. As shown in Table 1 and FIG. 1, no lacuna was produced in the molding of Examples 1 and 2. Further, the time required for curing was similar to conventional practice. After the polyurethane material was cured, the mold was opened and the sparsely foamed molded pad cover 2 for a stearing wheel 1 such as shown in FIG. 1 was released from the mold.

The effects of Examples 1 and 2 were determined in comparison with Comparative Examples 1–6, as shown in Table 1.

In Comparative Example 1, no flon was added but other component substances such as catalyst, pigment, etc., were similar to those used in conventional compositions. In this case, because of poor fluidity, the polyurethane material could not completely fill the mold cavity and the resulting molding had a lacuna.

In Comparative Examples 2 and 3, the content of the catalyst was reduced as compared to Comparative Example 1. The resulting moldings were not much different from Comparative Example 1.

In Comparative Example 4, the composition of the polyol mixture was changed from that of Comparative Example 1 so as to lower the viscosity of the polyurethane material. The resulting material was not fluid enough to avoid lacuna formation.

In Comparative Examples 5 and 6, air loading was performed at a higher rate than in Comparative Example 1, but the moldings still had a lacuna.

The present invention is not confined to the examples described above but can be otherwise embodied without departing from the spirit and scope of the invention.

What is claimed is:

1. A material for producing a polyurethane molded pad cover, comprising a polyol, an isocyanate and an urethane reaction retarding catalyst comprising a tertiary amine blocked with an acid, said material containing no foaming agent.

2. The material according to claim 1 wherein said acid is formic acid.

3. The material according to claim 2 wherein said retarding catalyst is available to retard urethane reaction prior to block dissociation and expedite the urethane reaction subsequent to block dissociation.

4. The material according to claim 3 wherein said tertiary amine is selected from the group consisting of triethylene diamine, bis(2-dimethylaminoethyl)ether, and N,N,N'-trimethylaminoethylpiperazine.

5. A method of molding a pad cover comprising the steps of:
mixing polyol, catalyst and isocyanate, wherein said catalyst includes a retarding catalyst comprising a tertiary amine blocked with formic acid; and
casting the polyol, catalyst and isocyanate mixture into a mold.

* * * * *